United States Patent
Tu et al.

(10) Patent No.: US 11,950,083 B2
(45) Date of Patent: Apr. 2, 2024

(54) HEAD TRACKING CORRELATED MOTION DETECTION FOR SPATIAL AUDIO APPLICATIONS

(71) Applicant: Apple Inc., Cupertino, CA (US)

(72) Inventors: Xiaoyuan Tu, Sunnyvale, CA (US); Margaret H. Tam, San Jose, CA (US); Halil Ibrahim Basturk, San Jose, CA (US); Alexander Singh Alvarado, San Jose, CA (US); Adam S. Howell, Oakland, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/351,205

(22) Filed: Jun. 17, 2021

(65) Prior Publication Data

US 2021/0400414 A1 Dec. 23, 2021

Related U.S. Application Data

(60) Provisional application No. 63/041,876, filed on Jun. 20, 2020.

(51) Int. Cl.
*H04S 7/00* (2006.01)

(52) U.S. Cl.
CPC .......... *H04S 7/303* (2013.01); *H04S 2420/01* (2013.01)

(58) Field of Classification Search
None
See application file for complete search history.

(56) References Cited

U.S. PATENT DOCUMENTS

| | | |
|---|---|---|
| 9,142,062 B2 | 9/2015 | Maciocci et al. |
| 9,459,692 B1 | 10/2016 | Li |
| 10,339,078 B2 | 7/2019 | Nair et al. |
| 11,582,573 B2 | 2/2023 | Tu et al. |
| 11,586,280 B2 | 2/2023 | Kriminger et al. |
| 11,589,183 B2 | 2/2023 | Tu et al. |
| 11,647,352 B2 | 5/2023 | Tam et al. |
| 11,675,423 B2 | 6/2023 | Akgul et al. |
| 2005/0281410 A1 | 12/2005 | Grosvenor et al. |
| 2014/0153751 A1 | 6/2014 | Wells |

(Continued)

OTHER PUBLICATIONS

Jolliffe et al., "Principal component analysis: a review and recent developments," Philosophical transactions of the royal society A: Mathematical, Physical and Engineering Sciences, Apr. 13, 2016, 374(2065):20150202, 16 pages.

(Continued)

*Primary Examiner* — Qin Zhu
(74) *Attorney, Agent, or Firm* — Fish & Richardson P.C.

(57) ABSTRACT

Embodiments are disclosed for head tracking state detection based on correlated motion of a source device and a headset communicatively coupled to the source device. In an embodiment, a method comprises: obtaining, using one or more processors of a source device, source device motion data from a source device and headset motion data from a headset; determining, using the one or more processors, correlation measures using the source device motion data and the headset motion data; updating, using the one or more processors, a motion tracking state based on the determined correlation measures; and initiating head pose tracking in accordance with the updated motion tracking state.

18 Claims, 10 Drawing Sheets

(56) References Cited

U.S. PATENT DOCUMENTS

| | | |
|---|---|---|
| 2015/0081061 A1 | 3/2015 | Aibara et al. |
| 2015/0302720 A1 | 10/2015 | Zhang et al. |
| 2016/0119731 A1 | 4/2016 | Lester, III |
| 2016/0262608 A1 | 9/2016 | Krueger |
| 2016/0269849 A1 | 9/2016 | Riggs et al. |
| 2017/0188895 A1 | 7/2017 | Nathan |
| 2017/0295446 A1 | 10/2017 | Thagadur Shivappa |
| 2018/0091923 A1* | 3/2018 | Satongar ............... H04R 5/033 |
| 2018/0125423 A1 | 5/2018 | Chang et al. |
| 2018/0176468 A1 | 6/2018 | Wang et al. |
| 2018/0220253 A1 | 8/2018 | Kärkkäinen et al. |
| 2018/0242094 A1 | 8/2018 | Baek et al. |
| 2019/0166435 A1 | 3/2019 | Crow et al. |
| 2019/0121522 A1 | 4/2019 | Davis et al. |
| 2019/0224528 A1 | 7/2019 | Omid-Zohoor et al. |
| 2019/0313201 A1* | 10/2019 | Torres ..................... H04R 5/04 |
| 2019/0379995 A1 | 12/2019 | Lee et al. |
| 2020/0037097 A1* | 1/2020 | Torres ..................... H04S 7/304 |
| 2020/0059749 A1 | 2/2020 | Casimiro Ericsson et al. |
| 2020/0169828 A1* | 5/2020 | Liu ....................... A63F 13/212 |
| 2021/0044913 A1 | 2/2021 | Haussler et al. |
| 2021/0211825 A1 | 7/2021 | Joyner et al. |
| 2021/0396779 A1 | 12/2021 | Sarathy et al. |
| 2021/0397249 A1 | 12/2021 | Kriminger et al. |
| 2021/0397250 A1 | 12/2021 | Akgul et al. |
| 2021/0400418 A1 | 12/2021 | Tam et al. |
| 2021/0400419 A1 | 12/2021 | Turgut et al. |
| 2021/0400420 A1 | 12/2021 | Tam et al. |
| 2022/0103964 A1 | 3/2022 | Tu et al. |
| 2022/0103965 A1 | 3/2022 | Tu et al. |

OTHER PUBLICATIONS

Zhang et al., "Template Matching Based Motion Classification for Unsupervised Post-Stroke Rehabilitation," Paper, Presented at Proceedings of the International Symposium on Bioelectronics and Bioinformations 2011, Suzhou, China, Nov. 3-5, 2011, pp. 199-202.

* cited by examiner

HEAD TRACKING CORRELATED MOTION DETECTION FOR SPATIAL AUDIO APPLICATIONS

CROSS-REFERENCE TO RELATED APPLICATION

This application claims priority to U.S. Provisional Patent Application No. 63/041,876, filed Jun. 20, 2020, the entire contents of which are incorporated herein by reference.

TECHNICAL FIELD

This disclosure relates generally to head pose tracking for spatial audio applications.

BACKGROUND

Spatial audio creates a three-dimensional (3D) virtual auditory space that allows a user wearing a headset to pinpoint where a sound source is located in the 3D virtual auditory space, while watching a movie, playing a video game or interacting with augmented reality (AR) content displayed on a source device (e.g., a computer screen). Some existing spatial audio platforms include a head pose tracker that uses a video camera to track the head pose of the user. Other existing spatial audio platforms use a single inertial measurement unit (IMU) in the headset for head pose tracking. If the source device is a mobile device (e.g., smartphone, tablet computer), then the source device and the headset are free to move relative to each other, which may adversely impact the user's perception of the 3D spatial audio. For example, in platforms that rely on a single IMU the audio would swivel off-center in cases such as movie-watching on a bus or plane that is turning, since it appears to the single headset IMU tracking solution that the user is turning their head.

SUMMARY

Embodiments are disclosed for correlated motion detection for spatial audio applications.

In an embodiment, a method comprises: obtaining, using one or more processors of a source device, source device motion data from a source device and headset motion data from a headset; determining, using the one or more processors, correlation measures using the source device motion data and the headset motion data; updating, using the one or more processors, a motion tracking state based on the determined correlation measures; and initiating motion tracking in accordance with the updated motion tracking state. The motion tracking state determines whether tracking is relative to the source device rotation, or ignore how the source device is rotating.

In an embodiment, updating the motion tracking state based on the determined correlation measures further comprises: transitioning from a single inertial measurement unit (IMU) tracking state to a two IMU tracking state, wherein the motion tracking is performed using relative motion data computed from the headset motion data and source device motion data.

In an embodiment, different size windows of motion data are used to compute short term and long term correlation measures.

In an embodiment, the short term correlation measures are computed based on a short term window of rotation rate data obtained from the source device, a short term window of rotation rate data obtained from the headset, a short term window of relative rotation rate data about a gravity vector, and a variance of the relative rotation rate data.

In an embodiment, the long term correlation measures are computed based on a long term window of rotation rate data obtained from the source device, a long term window of rotation rate data obtained from the headset, a long term window of relative rotation rate data about a gravity vector, and a variance of the relative rotation rate data.

In an embodiment, the correlation measures are logically combined into a single correlation measure indicating whether the source device motion and headset motion are correlated, and the single correlation measure triggers the updating of the motion tracking state from a single inertial measurement unit (IMU) tracking state to two IMU tracking state.

In an embodiment, the single correlation measure includes a confidence measure that indicates a confidence that the user is engaged in a particular activity that results in correlated motion.

In an embodiment, the particular activity includes at least one of walking or driving in a vehicle.

In an embodiment, the single correlation measure logically combines a mean relative rotation rate about a gravity vector, a determination that a mean short term rotation rate of the source device is less than a mean short term rotation rate of the headset and the confidence measure.

In an embodiment, the motion tracking state is updated from a two inertial measurement unit (IMU) tracking state to a single IMU tracking state based on whether the source device is rotating faster than the headset and that the source device rotation is inconsistent.

In an embodiment, a system comprises: one or more processors; memory storing instructions that when executed by the one or more processors, cause the one or more processors to perform operations: obtaining, using one or more processors of a source device, source device motion data from a source device and headset motion data from a headset worn on a head of a user; determining, using the one or more processors, correlation measures using the source device motion data and the headset motion data; updating, using the one or more processors, a motion tracking state based on the determined correlation measures; and initiating head pose tracking in accordance with the updated motion tracking state.

Other embodiments can include an apparatus, computing device and non-transitory, computer-readable storage medium.

Particular embodiments disclosed herein provide one or more of the following advantages. The disclosed embodiments allow a head pose tracker to transition to a relative motion head tracking state when motion data from a source device and headset are determined to be correlated. The relative motion head tracking state tracks the user's head rotations relative to the source device. For example, if the user turns their head to the side, the center audio channel will sound as if it is coming from the side of the user's head, such that the audio appears to be fixed in the same location relative to the user.

The details of one or more implementations of the subject matter are set forth in the accompanying drawings and the description below. Other features, aspects and advantages of the subject matter will become apparent from the description, the drawings and the claims.

DETAILED DESCRIPTION

Example Systems

Figure 1:
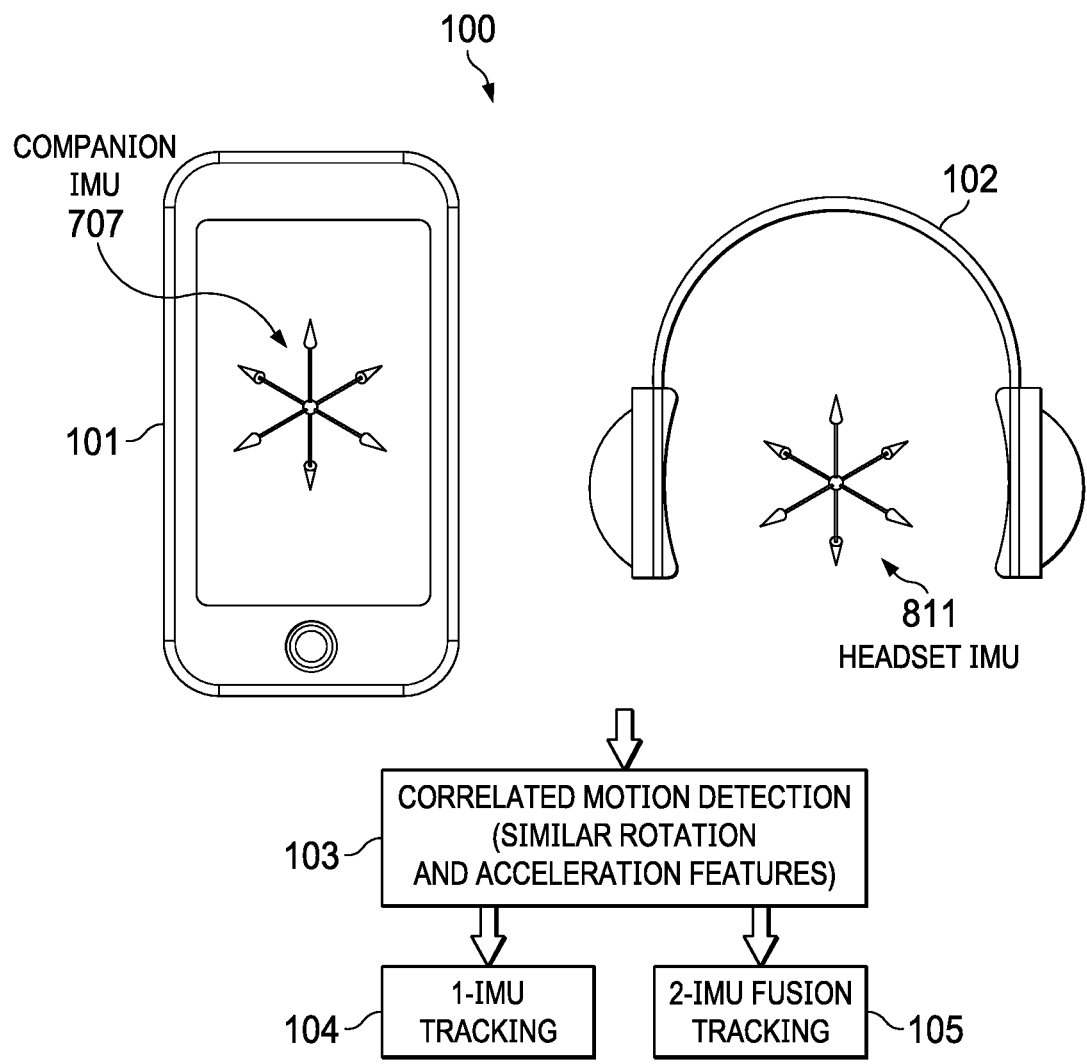
FIG. 1 is a conceptual diagram illustrating the use of correlated motion to select a motion tracking state, according to an embodiment.

FIG. 1 is a conceptual diagram illustrating the use of correlated motion to select a motion tracking state, according to an embodiment. In the example scenario shown, a user is viewing audio/visual (AV) content displayed on source device 101 while wearing headset 102 that is wired or wirelessly coupled to source device 101.

Source device 101 includes any device capable of displaying AV content and that can be wired or wirelessly coupled to headset 102, including but not limited to a smartphone, tablet computer, laptop computer, wearable computer, game console, television, etc. Source device 101 includes a display for presenting the visual portion of the AV content and IMU 707 that includes motion sensors (e.g., 3-axis MEMS gyro, 3-axis MEMS accelerometer) that output source device motion data (e.g., rotation rate, acceleration). Source device 101 further includes a spatial audio rendering engine (e.g., a binaural rendering engine) that simulates the main audio cues humans use to localize sounds including interaural time differences, interaural level differences, and spectral filtering done by the outer ears. An example source device architecture 700 is described in reference to FIG. 7.

Headset 102 is any device that includes loudspeakers for projecting acoustic audio, including but not limited to: headsets, earbuds, ear phones and loudspeakers (e.g., smart speakers). In an embodiment, headset 102 includes stereo (Left/Right) loudspeakers that output rendered spatial audio content generated by source device 101. Headset 102 also includes inertial measurement unit (IMU) 811 that includes motion sensors (e.g., 3-axis MEMS gyro, 3-axis MEMS accelerometer) that output headset motion data (e.g., rotation rate, acceleration).

In an embodiment, the headset motion data is transmitted to source device 101 over a short-range wireless communication channel (e.g., a Bluetooth channel). At source device 101, correlation motion detector 103 determines similarities (e.g., similar rotational and/or acceleration features) between the headset motion data and the source device motion data. If the headset data and source device motion data are determined to not be correlated, a head tracker is transitioned into a 1-IMU tracking state 104, where head tracking is performed using only the headset motion data. The 1-IMU tracking state 104, where head tracking is performed using only the headset motion data, allows arbitrary rotation of the source device (e.g., picking up the source device or rotating it around in the user's hands) to be ignored, so that this uncorrelated source device rotation does not cause the audio to shift around. If the headset motion data and the source device motion data are determined to be correlated, the head tracker is transitioned into a 2-IMU fusion tracking state 105, where head tracking is performed using relative motion data computed from the headset motion data and source device motion data. In both 1-IMU and 2-IMU states, the boresight vector is tracked which is the location of the source device from the perspective of the user's head. A relative pose tracking model, described in Appendix A, is used in both tracking states. The difference is that in the 1-IMU state, the rotation of the source device is ignored and does not affect the tracked boresight vector location. In the 2-IMU state, the boresight vector is updated to compensate for the rotation of the source device.

Figure 2:
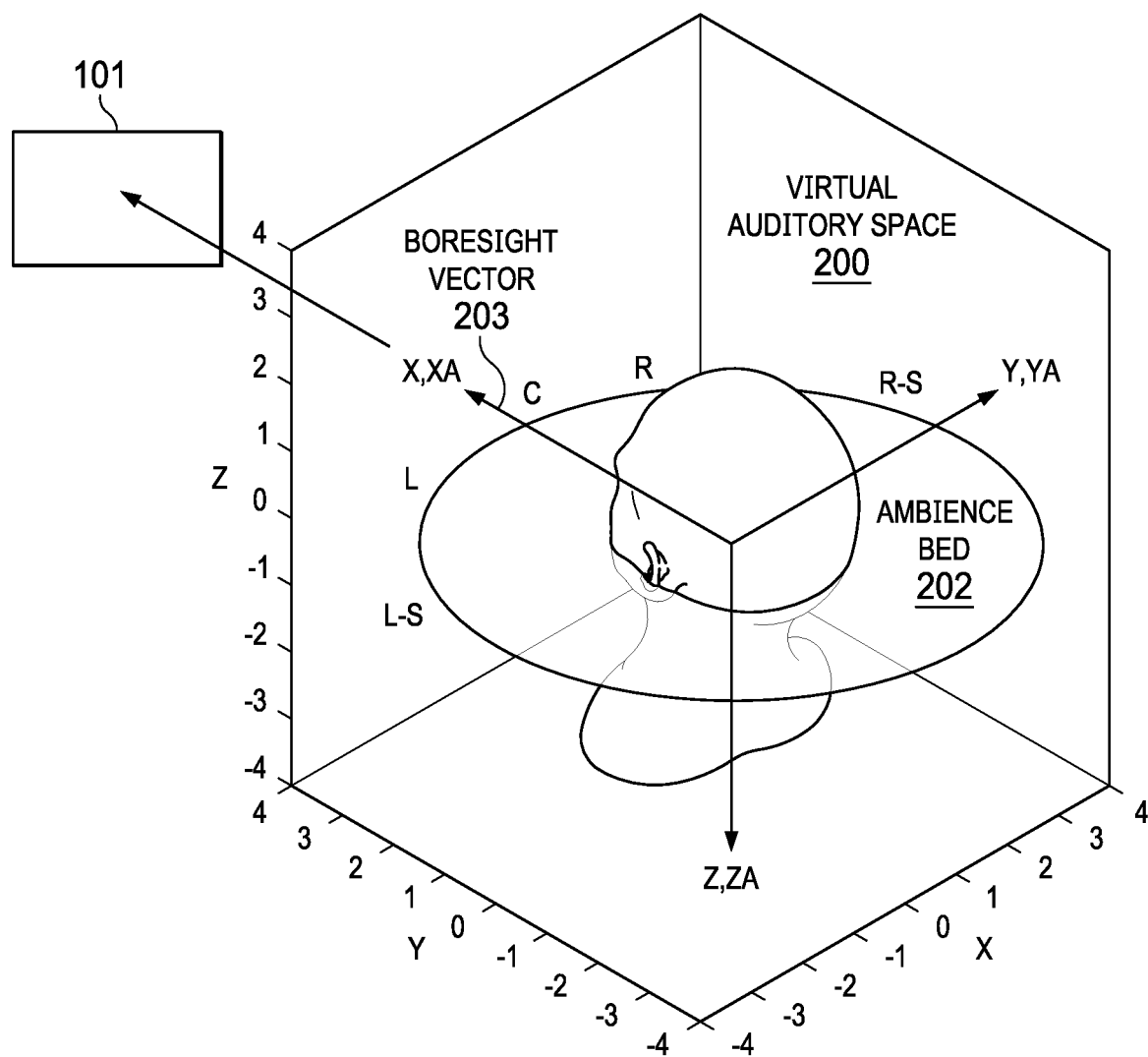
FIG. 2 illustrates the centering of a 3D virtual auditory space, according to an embodiment.

FIG. 2 illustrates a centered and inertially stabilized 3D virtual auditory space 200, according to an embodiment. The virtual auditory space 200 includes virtual sound sources or "virtual speakers" (e.g., center (C), Left (L), Right (R), left-surround (L-S) and right-surround (R-S)) that are rendered in ambience bed 202 using known spatial audio techniques, such as binaural rendering. To maintain the desired 3D spatial audio effect, it is desired that the center channel (C) be aligned with a boresight vector 203. The boresight vector 203 originates from a headset reference frame and terminates at a source device reference frame. When the virtual auditory environment is first initialized, the center channel is aligned with boresight vector 203 by rotating a reference frame for the ambience bed 202 ($X_A$, $Y_A$, $Z_A$) to align the center channel with boresight vector 203, as shown in FIG. 2.

This alignment process causes the spatial audio to be "centered." When the spatial audio is centered, the user perceives audio from the center channel (e.g., spoken dialogue) as coming directly from the display of source device 101. The centering is accomplished by tracking boresight vector 203 to the location of source device 101 from the head reference frame using an extended Kalman filter (EKF) tracking system, as described in Appendix A. Estimated boresight vector 203 only determines the location of the center channel. A second tracker takes as input the estimated boresight vector 203 and provides an output orientation of ambience bed 202, which determines the location of the L/L-S and R/R-S surround channels around the user in addition to the center channel. Aligning the center channel of ambience bed 202 with boresight vector 203 allows rendering the center channel at the estimated location of source device 101 for the user's perception.

If boresight vector 203 is not centered on source device 101 (e.g., due to tracking error), then aligning the center channel of ambience bed 202 will not "center" the audio, since the center channel will still be rendered at the erroneous estimate of the location of source device 101. Note that boresight vector 203 changes whenever the user's head rotates with respect to source device 101, such as when source device 101 is stationary in front of the user and the user's head is rotating. In this case, the motion of the user's head is accurately tracked as the head rotates, so that even when boresight vector 203 changes, the audio stays centered on the estimated location of source device 101 because the EKF is providing accurate tracking of how the true boresight vector 203 is changing. Also note that spatial audio becomes uncentered when the estimated boresight vector 203 is not the true location of source device 101 due to tracking error, which may come from drift over time, such as IMU propagation errors from gyro bias, etc., or other sources of error. In an embodiment, the tracking error is corrected using a bleed-to-zero (BTZ) process when the user is quiescent or a complex transition is detected, as described in Appendix A.

Note that ambience bed 202 shown in FIG. 2 is for a 5.1 audio format, where all audio channels are located in an $X_A Y_A$ plane of ambience bed 202 ($Z_A$=0), where $X_A$ is forward towards the center channel, $Y_A$ is right an $Z_A$ is down. Other embodiments, can have more or fewer audio channels, and the audio channels can be placed at different locations in the 3D virtual auditory space arbitrarily in any plane.

Figure 3:
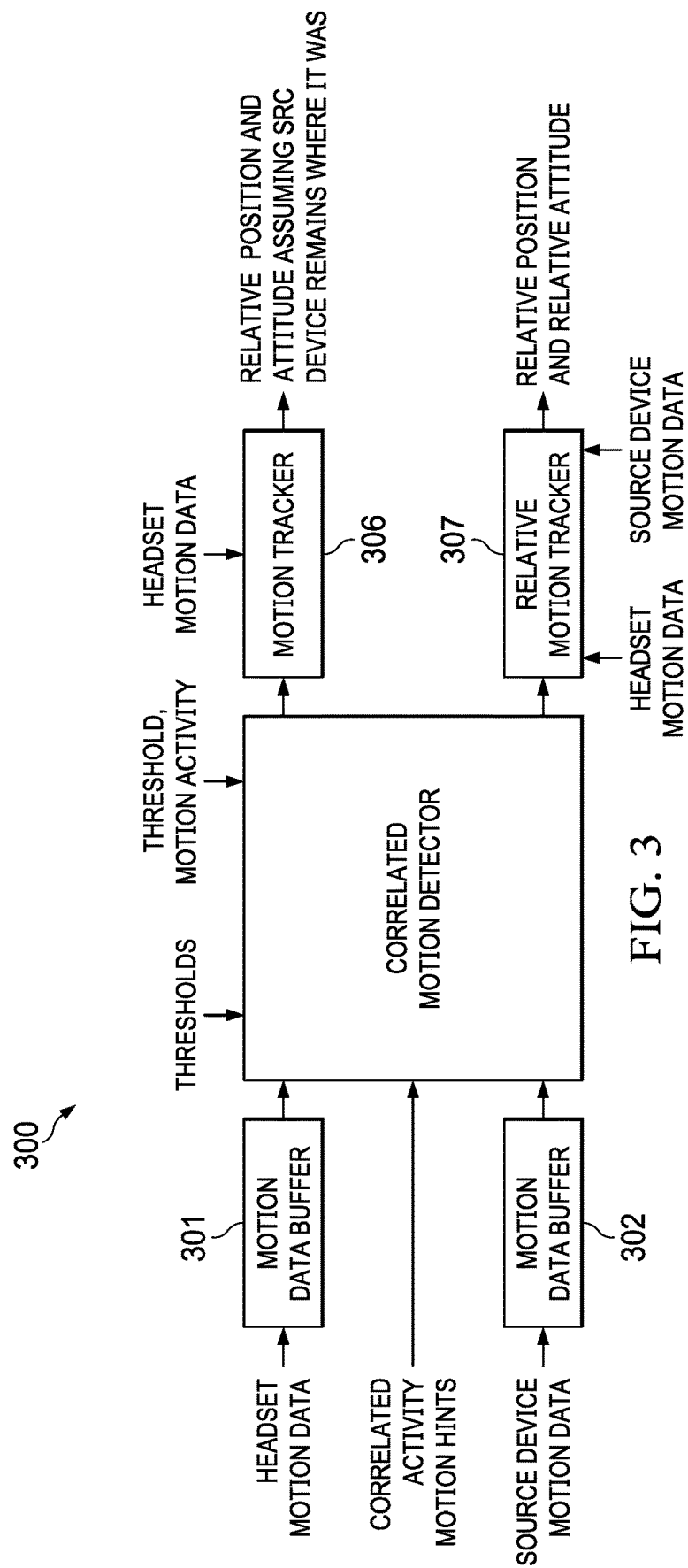
FIG. 3 is a block diagram of a system that uses correlated motion to select a motion tracking state, according to an embodiment.

FIG. 3 is a block diagram of a system 300 that uses correlated motion to select a motion tracking state, according to an embodiment. System 300 includes motion data buffers 301, 302, correlated motion detector 303, motion tracker 306 and relative motion tracker 307. In the example embodiments described herein, system 300 is implemented in source device 101. In other embodiments, some or all the components of system 300 can be included in headset 102.

Figure 4:
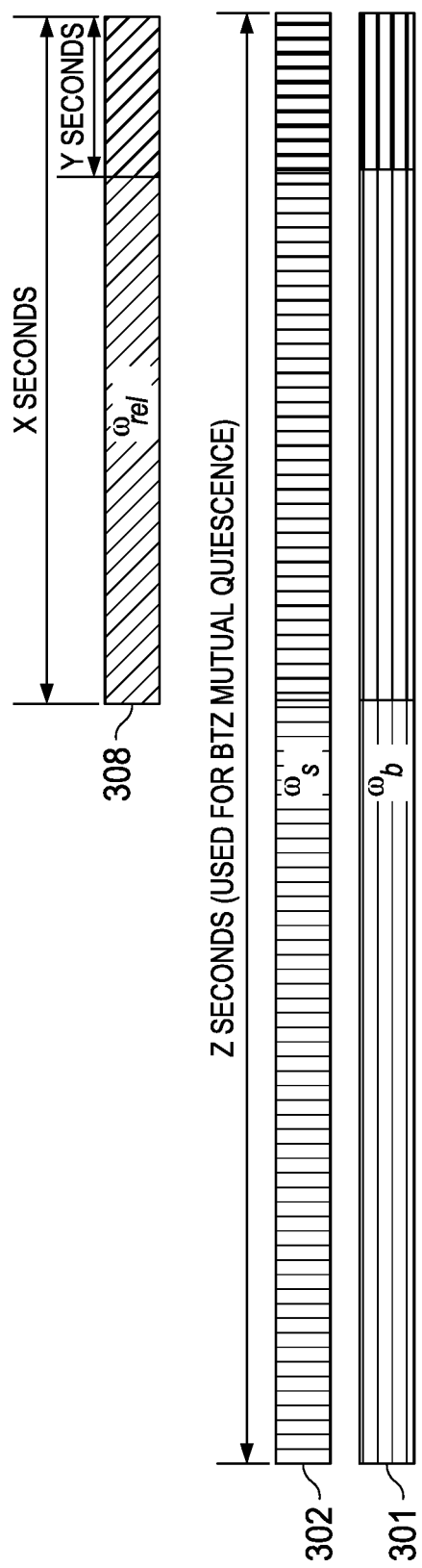
FIG. 4 illustrates the selection of different size windows of motion data samples to compute correlation measures, according to an embodiment.

Headset motion data received from headset 102 is stored in motion data buffer 301 and source device motion data is stored in motion data buffer 302. In an embodiment, there is also a motion buffer 308 for storing relative rotation rate samples. In an embodiment, several seconds of data is stored. Correlated motion detector 303 takes as input different size windows of the motion data from buffers 301, 302 for use in computing short term and long term correlation measures, as illustrated in FIG. 4. Correlated motion detector 303 also takes as input correlated activity motion hints from, e.g., an activity classifier that predicts that the user is walking, in vehicle, etc., based on sensor data. Correlated motion detector 303 also takes as input various thresholds used in the correlation measures, as described below. In an embodiment, the example correlation measures are computed as shown below. Note that the rotation rates $\omega_s^{short}$, $\omega_s^{long}$, $\omega_b^{short}$, $\omega_b^{long}$, $\omega_{rel}^{short}$ and $\omega_{rel}^{long}$ are vectors.

$$isCorrelatedShort = \|Var(\omega_{rel}^{short})\| < \tau_s \ \&\&$$
$$(ABS(\|Mean\ (\omega_s^{short})\| - \|Mean\ (\omega_b^{short})\|) <$$
$$r_s \| \frac{\|Mean\ (\omega_s^{long})\|}{\|Mean\ (\omega_b^{long})\|} \approx 1 \Big)$$

$$isCorrelatedLong = \|Var(\omega_{rel}^{long})\| < \tau_l \ \&\&$$
$$\|Mean\ (\omega_{rel}^{long})\| < a_l \ \&\&$$
$$(ABS(\|Mean\ (\omega_s^{long})\| - \|Mean\ (\omega_b^{long})\|) < r_l \|$$
$$\frac{\|Mean\ (\omega_s^{long})\|}{\|Mean\ (\omega_b^{long})\|} \approx 1 \Big)$$

$$correlatedRotation = isCorrelatedShort \ \&\&$$
$$isCorrelatedLong \ \&\&$$
$$MIN(\|Mean\ (\omega_s^{long})\|,\ \|Mean\ (\omega_b^{long})\|) > kLowRate$$

$$srcRotatingFaster =$$
$$\|Mean\ (\omega_s^{long})\| > kLowRate \ \&\&$$

Equations [1] – [5]

$$\|Mean\ (\omega_b^{long})\| < kLowRate \ \&\&$$
$$\|Mean\ (\omega_{rel}^{long})\| \geq 2 \times kLowRate$$

$$inconsistentRotation = \|Mean\ (\omega_s^{short}) \geq r_s \ \&\&$$
$$\left( \frac{\omega_s^{short}[end^*]}{\|\omega_s^{short}[end^*]\|} \cdot \frac{\omega_s^{short}[0^*]}{\|\omega_s^{short}[0^*]\|} < \kappa \right\|$$
$$(icorrelatedRotation \ \&\& rotOffGravity) \Big)$$

$\omega_s^{short}$ is a short term window of rotation rate of the source device
$\omega_s^{long}$ is the long term window of rotation rate of the source device
$\omega_b^{short}$ is the short term window of rotation rate of the headset
$\omega_b^{long}$ is the long term window of rotation rate of the headset
$\omega_{rel}^{short}$ is the short term window of relative rotation rate computed as ($\omega_s^{short} - \omega_b^{short}$)
$\omega_{rel}^{long}$ is the long term window of relative rotation rate computed as ($\omega_s^{long} - \omega_b^{long}$)
Var($\omega_{rel}^{short}$) is the variance of a short buffer (e.g., Y seconds) windowed samples of relative rotation rate around the gravity vector
Var/Mean($\omega_s^{long}$): variance/Mean of long buffer (e.g., X seconds, where X>Y) of relative rotation rate around the gravity vector
&& represents the "AND" Boolean operator
|| represents the "OR" Boolean operator
$\tau_s$, $\tau_l$, $r_s$, $r_l$, $\alpha_l$, $r_\epsilon$, $\kappa$, kLowRate are threshold values determined empirically The example correlation measures computed above are used by state machine 304 to transition from a 1-IMU state 501 to a 2-IMU state 502 and back again. For example, a transition will occur from 1-IMU state 501 to 2-IMU state 502 when rotation is correlated and thus satisfies Equation [6]:

(correlatedRotation==true||(isInCorrelatedActivity&& rotationAroundGravityLongBufferMeanDiff(src, aux)<θ))&& srcRotationRateMean Short<auxRotationRateMeanShort+δ        Equation [6]

where correlatedRotation computed according to Equation [3] is TRUE, srcMotionActivity is a state variable in a motion activity state machine implemented in the source device that indicates (based on analysis of inertial sensor and digital pedometer data) an estimated motion activity state, and VehicularOrWalkingHighConf is a particular motion activity state in the motion activity state machine that indicates with high confidence that the source device is in a vehicle or attached to a user who is walking. Note isInCorrelatedActivity indicates that the user is walking, in a vehicle, in a plane, etc., and can be provided by an activity classifier, as previously described. Also note that correlatedRotation is about the inertial gravity vector, e.g., if both devices are rotating or maintaining their yaw rate similarly.

A transition from 2-IMU state 502 to 1-IMU state 501 will occur when the source device is rotating faster than the headset and thus satisfies Equation [7]:

srcRotatingFaster||(|Var($\omega_{rel}^{short}$)
||>$\tau_1$&&inconsistentSrcRotation),        Equation [7]

where srcRotatingFaster and inconsistentSrcRotation are computed using Equations [4] and [5], respectively.

The reason for having a 1-IMU state 501 and 2-IMU-state 502 is to prevent an undesirable listener experience in un-correlated motion scenarios, where head tracking relative to position/attitude can result in a potential ill effect (e.g., causing the user to be nauseated) due to the audio source moving around too much. 1-IMU state 501 allows tracking of the user's head rotations relative to an assumed static source device in such situations, hence limiting the potential ill effects. Conversely, during correlated motion scenarios, where the source device is moving/rotating with the headset (e.g., while the user is walking and watching content in a vehicle/plane), it is desirable that tracking is performed in 2-IMU state 502 (estimating the relative position/attitude between the two devices) to maintain the illusion of 3D sound, originating from the source device, even when the user or the vehicle is turning.

The output of correlated motion detector 303 (correlatedRotation) is input into motion tracker 306 and relative motion tracker 307. Note that motion tracker 306 outputs relative position and relative attitude, assuming the source device remains stationary.

The process described above meets multiple design criteria: 1) to operate in the 1-IMU state 501, unless the devices are detected (with good confidence) to be in a moving frame; 2) to detect un-correlated/complex motion and transition to the 1-IMU state 501 with minimal delay (i.e., minimizing tracking error); and 3) to minimize unnecessary transitions between 1-IMU state 501 and 2-IMU state 502.

FIG. 4 illustrates the selection of different size windows of motion data samples to compute correlation measures, according to an embodiment. In the example shown, the short term relative rotation rate is computed using a Y-second window of the buffered rotation rate samples, and the long term relative rotation rate is computed using a X-second window of the buffered rotation rate samples. Note that the full buffers 301, 302 store Z-seconds of samples of rotation rates for the headset and source device, respectively, and are used for opportunistic corrections during mutual quiescence (e.g., source device and headset are static) to relative position and attitude predictions when camera anchor measurements are not available (Bleed-to-zero (BTZ)), as described in Appendix A.

Example Processes

Figure 6:
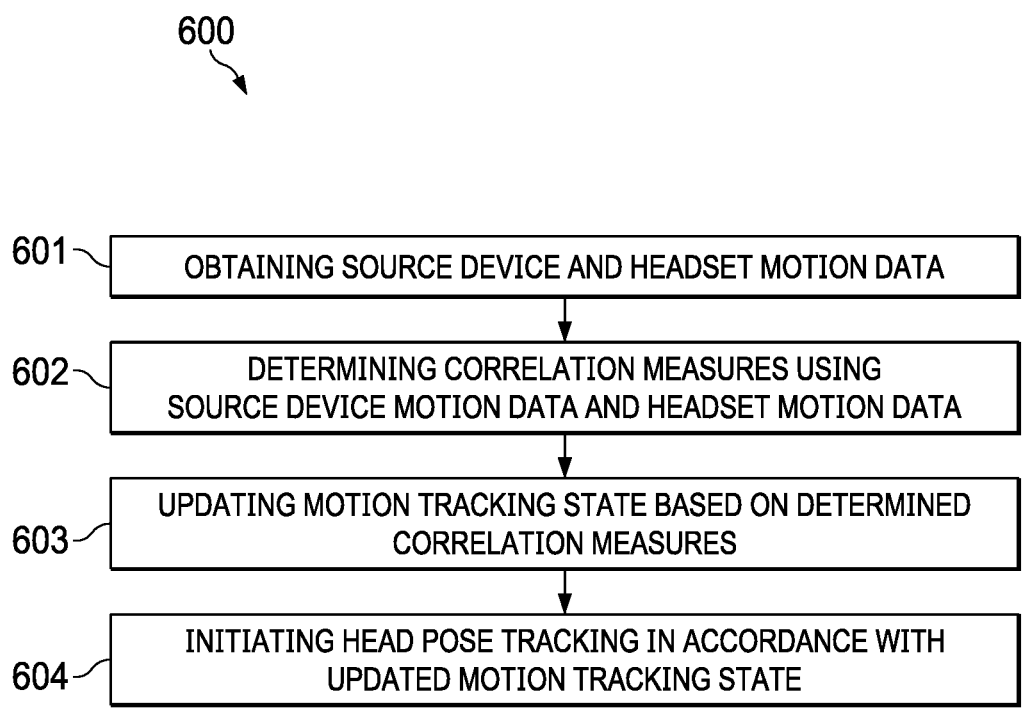
FIG. 6 is a flow diagram of a process of detecting correlated motion, according to an embodiment.

FIG. 6 is a flow diagram of process 600 of using correlated motion to select a motion tracking state, in accordance with an embodiment. Process 600 can be implemented using, for example, the source device architecture 700 and headset architecture 800, as described in reference to FIGS. 7 and 8, respectively.

Process 600 begins by obtaining source device and headset motion data (601). For example, motion data output by IMUs in the source device and headset can be stored in buffers as shown in FIG. 4. Note that the headset is communicatively coupled to the source device and sends its motion data to the source device over a wired or wireless communication channel (e.g., a Bluetooth channel).

Process 600 continues by determining correlation measures using the source device motion data and the headset motion data (602). For example, the correlation measures shown in Equations [1]-[5] are computed using the respective rotation rates output by the source device and headset IMUs and relative rotation rates computed from the respective source device and headset rotation rates and the estimation of relative attitude.

Figure 5:
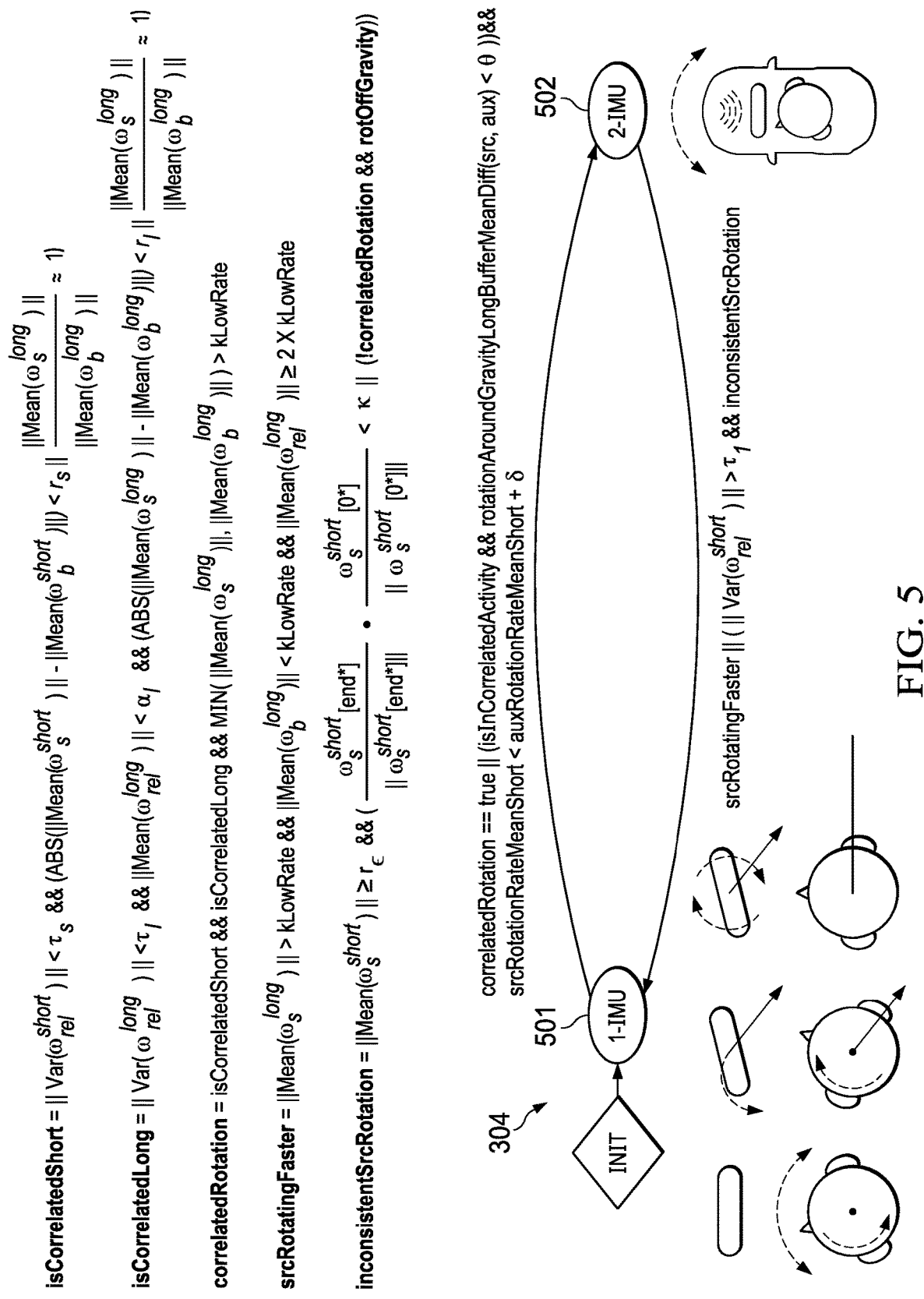
FIG. 5 illustrates operation of a state machine for selecting a motion tracking state, according to an embodiment.

Process 600 continues by updating a motion tracking state based on the determined correlation measures (603), and initiating head pose tracking in accordance with the updated motion tracking state (604), as described in reference to FIG. 5.

Example Software/Hardware Architectures

Figure 7:
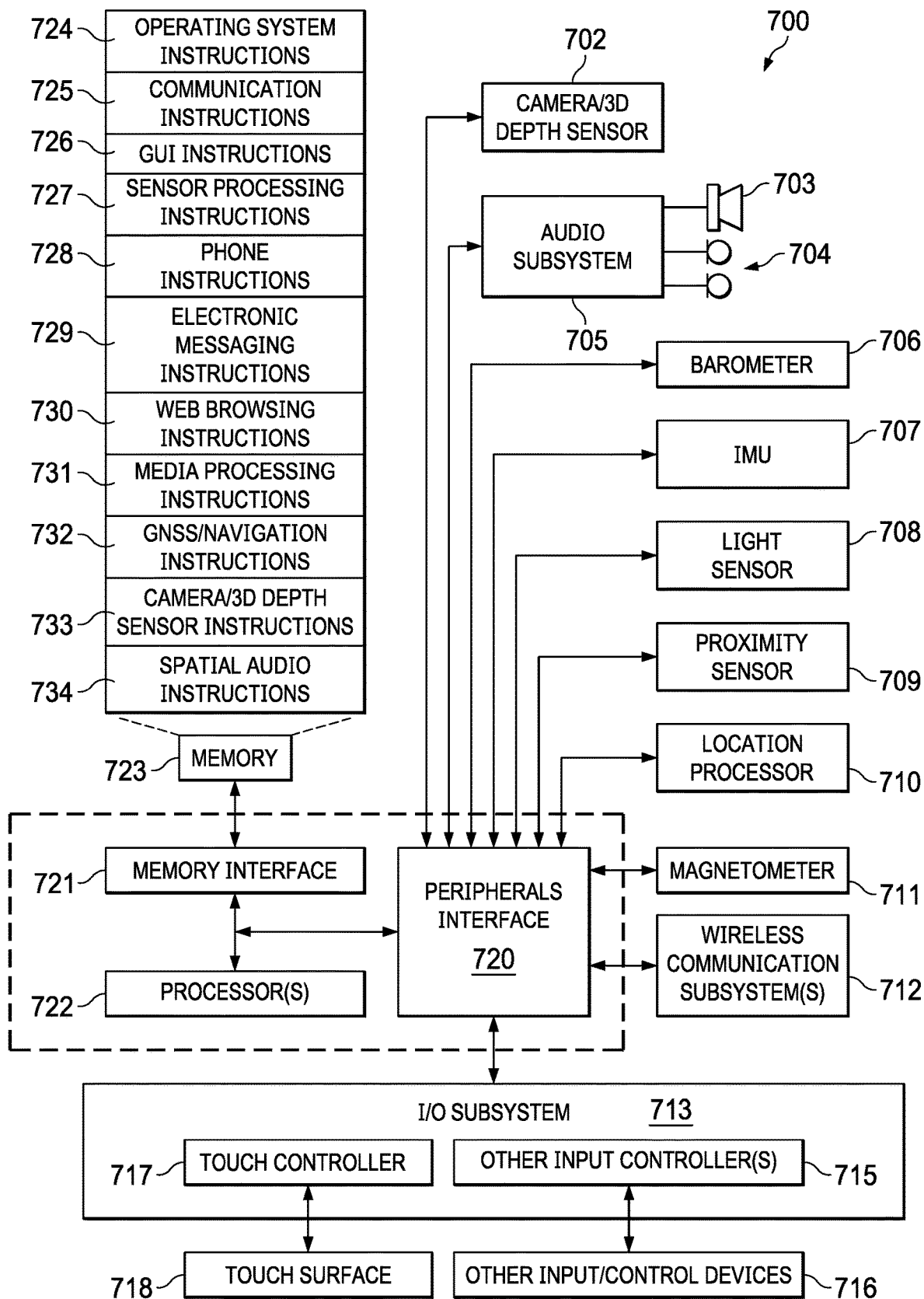
FIG. 7 is a block diagram of source device architecture implementing the features and operations described in reference to FIGS. 1-6.

FIG. 7 is a conceptual block diagram of source device software/hardware architecture 700 implementing the features and operations described in reference to FIGS. 1-6. Architecture 700 can include memory interface 721, one or more data processors, digital signal processors (DSPs), image processors and/or central processing units (CPUs) 722 and peripherals interface 720. Memory interface 721, one or more processors 722 and/or peripherals interface 720 can be separate components or can be integrated in one or more integrated circuits.

Sensors, devices and subsystems can be coupled to peripherals interface 720 to provide multiple functionalities. For example, IMU 707, light sensor 708 and proximity sensor 709 can be coupled to peripherals interface 720 to facilitate motion sensing (e.g., acceleration, rotation rates), lighting and proximity functions of the wearable computer. Location processor 710 can be connected to peripherals interface 720 to provide geo-positioning. In some implementations, location processor 710 can be a GNSS receiver, such as the Global Positioning System (GPS) receiver. Electronic magnetometer 711 (e.g., an integrated circuit chip) can also be connected to peripherals interface 720 to provide data that can be used to determine the direction of magnetic North. Electronic magnetometer 711 can provide data to an electronic compass application. IMU 707 includes one or more accelerometers and/or gyros (e.g., 3-axis MEMS accelerometer and 3-axis MEMS gyro) configured to determine acceleration and attitude (e.g., rotation rate) of the source device, as described in reference to FIGS. 1-6. Barometer 706 can be configured to measure atmospheric pressure around the source device.

Camera/3D depth sensor 702 captures digital images and video and can include both forward-facing and rear-facing cameras. The 3D depth sensor can be any sensor capable of capturing 3D data or point clouds, such as a time of flight (TOF) sensor or LiDAR.

Communication functions can be facilitated through wireless communication subsystems 712, which can include radio frequency (RF) receivers and transmitters (or transceivers) and/or optical (e.g., infrared) receivers and transmitters. The specific design and implementation of the wireless communication subsystem 712 can depend on the communication network(s) over which a mobile device is intended to operate. For example, architecture 700 can include communication subsystems 712 designed to operate over a GSM network, a GPRS network, an EDGE network, a Wi-Fi™ network and a Bluetooth™ network. In particular, the wireless communication subsystems 712 can include hosting protocols, such that the mobile device can be configured as a base station for other wireless devices.

Audio subsystem 705 can be coupled to a speaker 703 and one or more microphones 704 to facilitate voice-enabled functions, such as voice recognition, voice replication, digital recording and telephony functions. Audio subsystem 705 can be configured to receive an interpret voice commands from the user using speech detection and recognition engine.

I/O subsystem 713 can include touch surface controller 717 and/or other input controller(s) 715. Touch surface controller 717 can be coupled to a touch surface 718. Touch surface 718 and touch surface controller 717 can, for example, detect contact and movement or break thereof using any of a plurality of touch sensitivity technologies, including but not limited to capacitive, resistive, infrared and surface acoustic wave technologies, as well as other proximity sensor arrays or other elements for determining one or more points of contact with touch surface 746. Touch surface 718 can include, for example, a touch screen or the digital crown of a smart watch. I/O subsystem 713 can include a haptic engine or device for providing haptic feedback (e.g., vibration) in response to commands from processor or a digital signal processor (DSP) 722. In an embodiment, touch surface 718 can be a pressure-sensitive surface.

Other input controller(s) 744 can be coupled to other input/control devices 716, such as one or more buttons, rocker switches, thumb-wheel, infrared port and USB port. The one or more buttons (not shown) can include an up/down button for volume control of speaker 703 and/or microphones 704. Touch surface 718 or other input control devices 716 (e.g., a button) can include, or be coupled to, fingerprint identification circuitry for use with a fingerprint authentication application to authenticate a user based on their fingerprint(s).

In one implementation, a pressing of the button for a first duration may disengage a lock of the touch surface 718; and a pressing of the button for a second duration that is longer than the first duration may turn power to the mobile device on or off. The user may be able to customize a functionality of one or more of the buttons. The touch surface 718 can, for example, also be used to implement virtual or soft buttons.

In some implementations, the mobile device can present recorded audio and/or video files, such as MP3, AAC and MPEG files. In some implementations, the mobile device can include the functionality of an MP3 player. Other input/output and control devices can also be used.

Memory interface 721 can be coupled to memory 723. Memory 723 can include high-speed random access memory and/or non-volatile memory, such as one or more magnetic disk storage devices, one or more optical storage devices and/or flash memory (e.g., NAND, NOR). Memory 723 can store operating system 724, such as the iOS operating system developed by Apple Inc. of Cupertino, California. Operating system 724 may include instructions for handling basic system services and for performing hardware dependent tasks. In some implementations, operating system 724 can include a kernel (e.g., UNIX kernel).

Memory 723 may also store communication instructions 725 to facilitate communicating with one or more additional devices, one or more computers and/or one or more servers, such as, for example, instructions for implementing a software stack for wired or wireless communications with other devices. Memory 723 may include graphical user interface instructions 726 to facilitate graphic user interface processing; sensor processing instructions 727 to facilitate sensor-related processing and functions; phone instructions 728 to facilitate phone-related processes and functions; electronic messaging instructions 729 to facilitate electronic-messaging related processes and functions; web browsing instructions 730 to facilitate web browsing-related processes and functions; media processing instructions 731 to facilitate media processing-related processes and functions; GNSS/Location instructions 732 to facilitate generic GNSS and location-related processes; and camera/3D depth sensor instructions 733 for capturing images (e.g., video, still images) and depth data (e.g., a point cloud). Memory 723 further includes spatial audio instructions 734 for use in spatial audio applications, including but not limited AR and immersive video applications.

Each of the above identified instructions and applications can correspond to a set of instructions for performing one or more functions described above. These instructions need not be implemented as separate software programs, procedures, or modules. Memory 723 can include additional instructions or fewer instructions. Furthermore, various functions of the mobile device may be implemented in hardware and/or in software, including in one or more signal processing and/or application specific integrated circuits.

Figure 8:
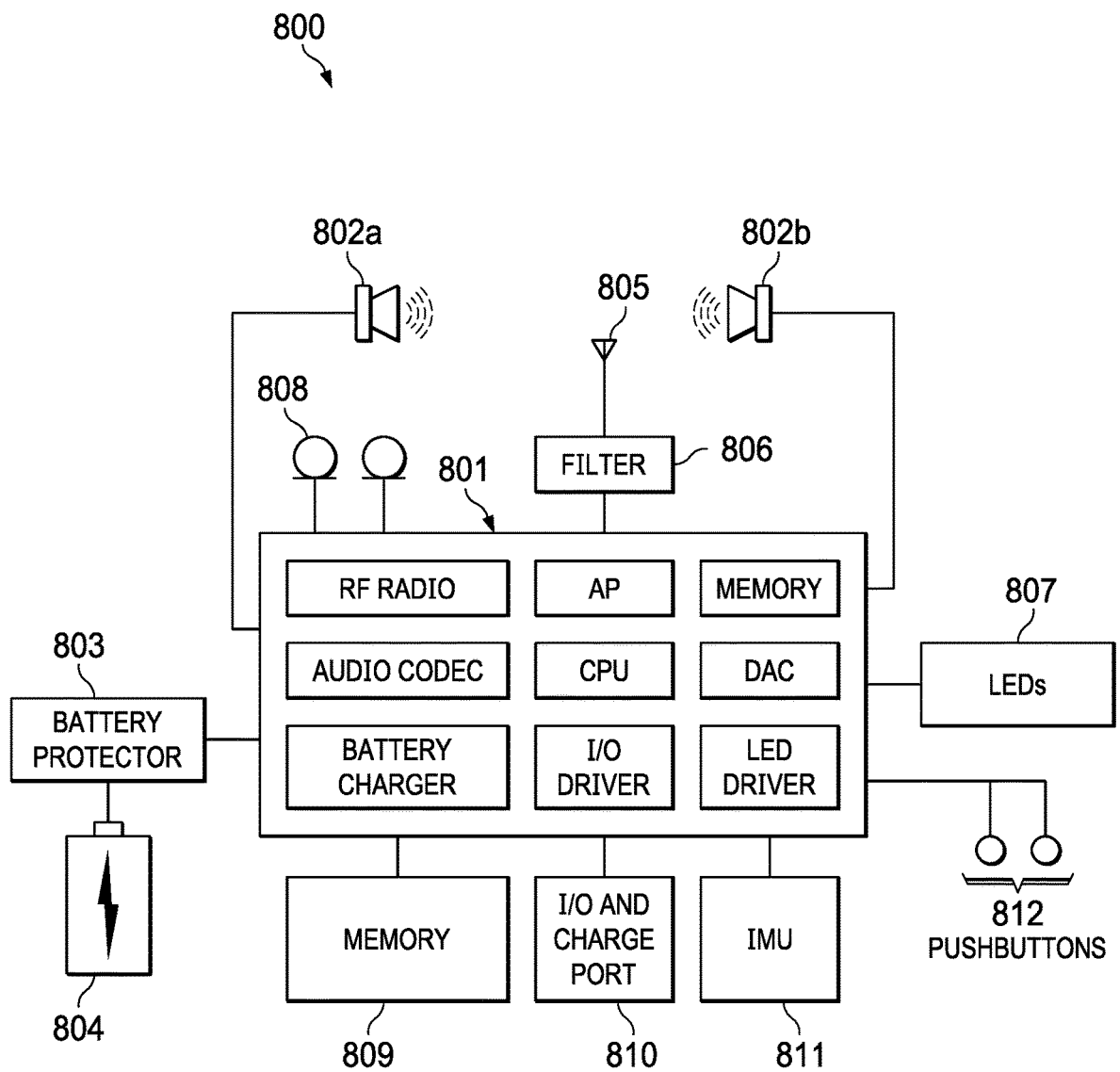
FIG. 8 is a block diagram of headset architecture implementing the features and operations described in reference to FIGS. 1-6.

FIG. 8 is a conceptual block diagram of headset software/hardware architecture 170 implementing the features and operations described in reference to FIGS. 1-6. In an embodiment, architecture 800 can includes system-on-chip (SoC) 801, stereo loudspeakers 802a, 802b (e.g., ear buds, headphones, ear phones), battery protector 803, rechargeable battery 804, antenna 805, filter 806, LEDs 807, microphones 808, memory 809 (e.g., flash memory), I/O/Charge port 810, IMU 811 and pushbuttons 812 for turning the headset on and off, adjusting volume, muting, etc. Headset IMU 811 was previously described in reference to FIGS. 1-6, and includes, for example, a 3-axis MEMS gyro and a 3-axis MEMS accelerometer.

SoC 801 further includes various modules, such as a radio frequency (RF) radio (wireless transceiver) for wireless bi-directional communication with other devices, such as a source device 101, as described in reference to FIGS. 1-6. SoC 801 further includes an application processor (AP) for running specific applications, memory (e.g., flash memory), central processing unit (CPU) for managing various functions of the headsets, audio codec for encoding/decoding audio, battery charger for charging/recharging rechargeable battery 804, I/O driver for driving I/O and charge port 810 (e.g., a micro USB port), digital to analog converter (DAC) converting digital audio into analog audio and LED driver for driving LEDs 807. Other embodiments can have more or fewer components.

Figure 9:
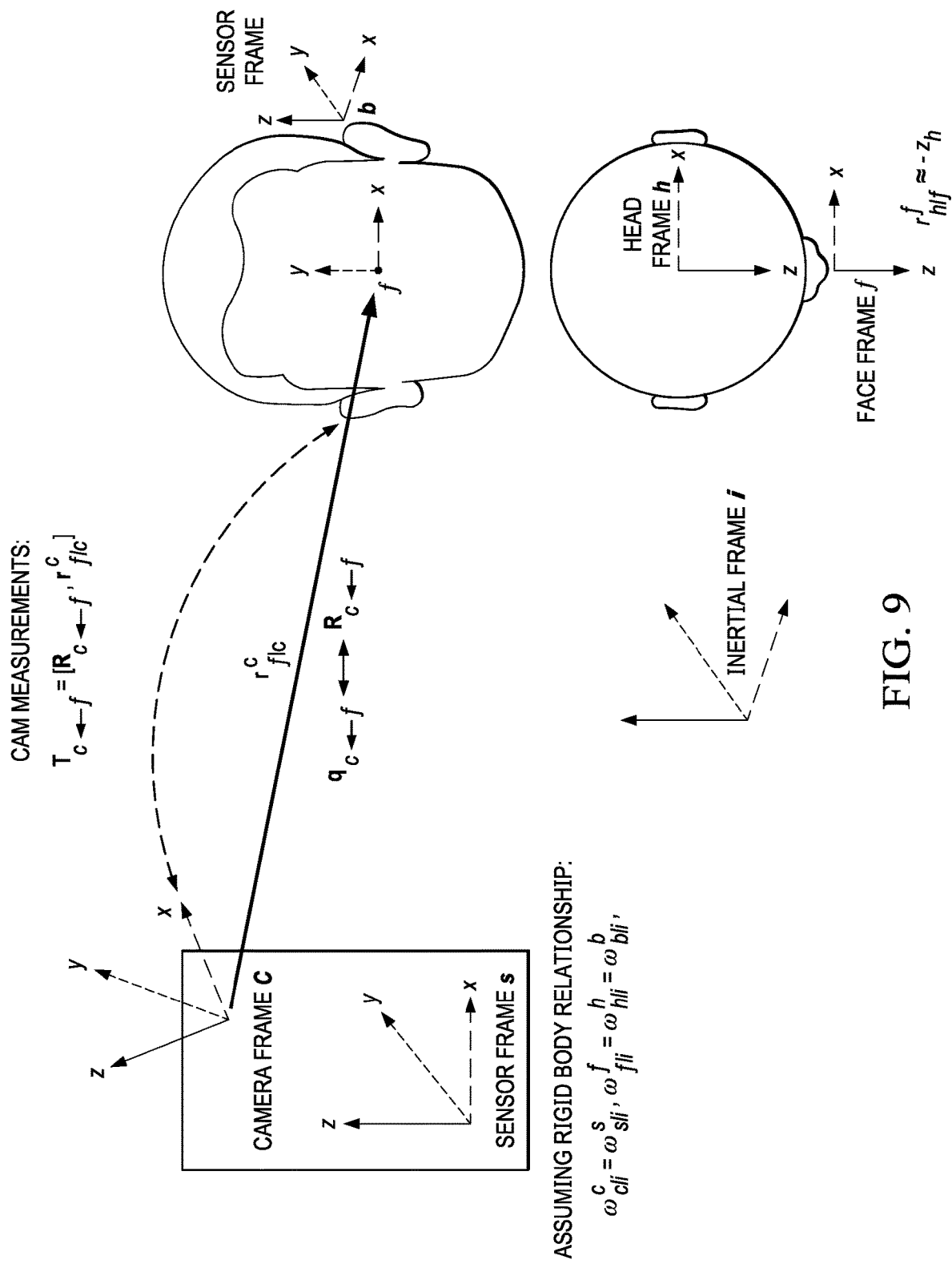
FIG. 9 illustrates various reference frames and notation for relative pose tracking, according to an embodiment.

FIG. 9 illustrates various reference frames and notation for relative pose tracking, according to an embodiment, as described more fully in Appendix A attached hereto.

Figure 10:
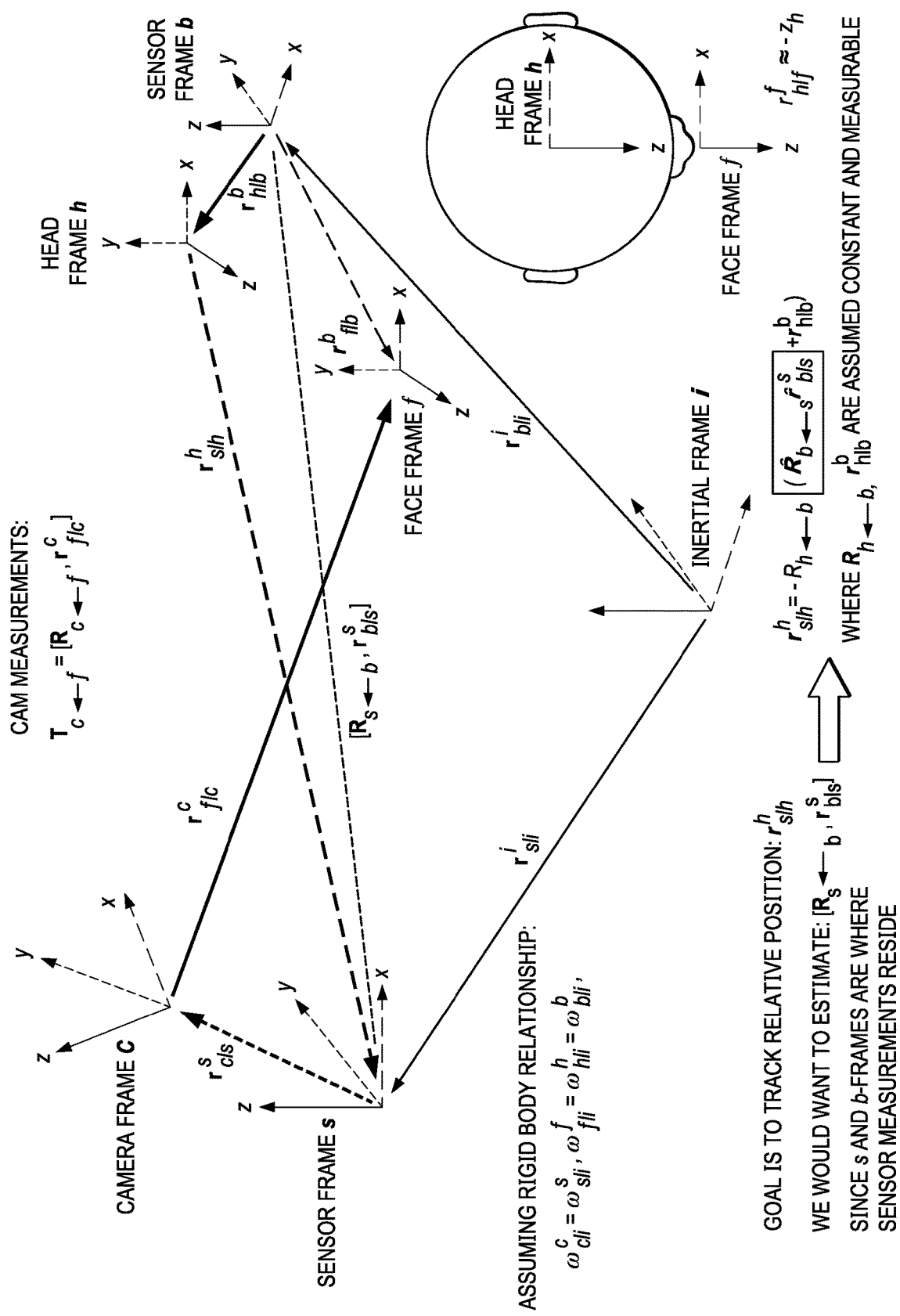
FIG. 10 illustrates the geometry for a relative motion model used in headtracking, according to an embodiment.

FIG. 10 illustrates the geometry for a relative motion model used in headtracking, according to an embodiment, as described more fully in Appendix A attached hereto.

The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language (e.g., SWIFT, Objective-C, C#, Java), including compiled or interpreted languages, and it can be deployed in any form, including as a stand-alone program or as a module, component, subroutine, a browser-based web application, or other unit suitable for use in a computing environment.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

As described above, some aspects of the subject matter of this specification include gathering and use of data available from various sources to improve services a mobile device can provide to a user. The present disclosure contemplates that in some instances, this gathered data may identify a particular location or an address based on device usage. Such personal information data can include location-based data, addresses, subscriber account identifiers, or other identifying information.

The present disclosure further contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. For example, personal information from users should be collected for legitimate and reasonable uses of the entity and not shared or sold outside of those legitimate uses. Further, such collection should occur only after receiving the informed consent of the users. Additionally, such entities would take any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices.

In the case of advertisement delivery services, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

What is claimed is:

1. A method comprising:
obtaining, using one or more processors of a source device, source device motion data from a source device and headset motion data from a headset worn on a head of a user;
determining, using the one or more processors, correlation measures using the source device motion data and the headset motion data;
updating, using the one or more processors, a motion tracking state based on the determined correlation measures, the updating including transitioning from a single inertial sensor tracking state to a two inertial sensor tracking state, wherein the motion tracking is performed using relative motion data computed from the headset motion data and source device motion data; and
initiating head pose tracking in accordance with the updated motion tracking state.

2. The method of claim 1, wherein different size windows of motion data are used to compute short term and long term correlation measures.

3. The method of claim 2, wherein the short term correlation measures are computed based on a short term window of rotation rate data obtained from the source device, a short term window of rotation rate data obtained from the headset, a short term window of relative rotation rate data about a gravity vector, and a variance of the relative rotation rate data.

4. The method of claim 2, wherein the long term correlation measures are computed based on a long term window of rotation rate data obtained from the source device, a long term window of rotation rate data obtained from the headset, a long term window of relative rotation rate data about a gravity vector, and a variance of the relative rotation rate data.

5. The method of claim 1, wherein two or more of the correlation measures are logically combined into a single correlation measure indicating whether the source device motion and headset motion are correlated, and the single correlation measure triggers the updating of the motion tracking state from a single inertial sensor tracking state to two inertial sensor tracking state.

6. The method of claim 5, wherein the single correlation measure includes a confidence measure that indicates a confidence that the user is engaged in a particular activity that results in correlated motion.

7. The method of claim 6, wherein the particular activity includes at least one of walking or driving in a vehicle.

8. The method of claim 6, wherein the two or more of the correlation measures include a mean relative rotation rate about a gravity vector, a determination that a mean short term rotation rate of the source device is less than a mean short term rotation rate of the headset and the confidence measure.

9. The method of claim 1, wherein the motion tracking state is updated from a two inertial sensor tracking state to a single inertial sensor tracking state based on whether the source device is rotating faster than the headset and that the source device rotation is inconsistent.

10. A system comprising:
one or more processors;
memory storing instructions that when executed by the one or more processors, cause the one or more processors to perform operations:
obtaining, using one or more processors of a source device, source device motion data from a source device and headset motion data from a headset worn on a head of a user;
determining, using the one or more processors, correlation measures using the source device motion data and the headset motion data;
updating, using the one or more processors, a motion tracking state based on the determined correlation measures, the updating including transitioning from a single inertial sensor tracking state to a two inertial sensor tracking state, wherein the motion tracking is performed using relative motion data computed from the headset motion data and source device motion data; and
initiating head pose tracking in accordance with the updated motion tracking state.

11. The system of claim 10, wherein different size windows of motion data are used to compute short term and long term correlation measures.

12. The system of claim 11, wherein the short term correlation measures are computed based on a short term window of rotation rate data obtained from the source device, a short term window of rotation rate data obtained from the headset, a short term window of relative rotation rate data about a gravity vector, and a variance of the relative rotation rate data.

13. The system of claim 11, wherein the long term correlation measures are computed based on a long term window of rotation rate data obtained from the source device, a long term window of rotation rate data obtained from the headset, a long term window of relative rotation rate data about a gravity vector, and a variance of the relative rotation rate data.

14. The system of claim 10, wherein two or more of the correlation measures are logically combined into a single correlation measure indicating whether the source device motion and headset motion are correlated, and the single correlation measure triggers the updating of the motion tracking state from a single inertial sensor tracking state to two inertial sensor tracking state.

15. The system of claim 14, wherein the single correlation measure includes a confidence measure that indicates a confidence that the user is engaged in a particular activity that results in correlated motion.

16. The system of claim 15, wherein the particular activity includes at least one of walking or driving in a vehicle.

17. The system of claim 15, wherein the two or more of the correlation measures include a mean relative rotation rate about a gravity vector, a determination that a mean short term rotation rate of the source device is less than a mean short term rotation rate of the headset and the confidence measure.

18. The system of claim 10, wherein the motion tracking state is updated from a two inertial sensor tracking state to a single inertial sensor tracking state based on whether the source device is rotating faster than the headset and that the source device rotation is inconsistent.

* * * * *